United States Patent [19]
Padilla

[11] Patent Number: 5,440,809
[45] Date of Patent: Aug. 15, 1995

[54] DUST COLLECTOR FOR HAND-HELD POWER TOOL

[76] Inventor: Daniel G. Padilla, 4545 W. Ave., M6, Quartz Hill, Calif. 93536

[21] Appl. No.: 132,461

[22] Filed: Oct. 6, 1993

[51] Int. Cl.$^6$ .............................................. B25F 5/02
[52] U.S. Cl. ...................................... 30/124; 30/390; 451/451; 451/456
[58] Field of Search ............... 30/124, 390; 83/100; 51/268, 273; 451/451, 456

[56] References Cited

U.S. PATENT DOCUMENTS

| | | | |
|---|---|---|---|
| 1,876,337 | 9/1932 | Mead | 30/124 |
| 2,773,337 | 12/1956 | De Marchi | 51/273 |
| 4,151,705 | 5/1979 | Evans | 51/273 |
| 4,200,417 | 4/1980 | Hager et al. | 83/100 |
| 4,253,362 | 3/1981 | Olson | 83/100 |

Primary Examiner—Kenneth E. Peterson
Attorney, Agent, or Firm—James E. Brunton

[57] ABSTRACT

A dust collection apparatus which is usable with various types of hand-held power tools, such as high speed grinders, and which surrounds the cutting element of the tool in a manner to efficiently capture the debris produced during the cutting operation even when cutting overhead. The apparatus is provided with a novel spring-loaded work engaging foot which is movable relative to the cutting tool during the cutting operation in a manner to insure the effective capture of substantially all of the particulate matter generated during cutting operation.

14 Claims, 3 Drawing Sheets

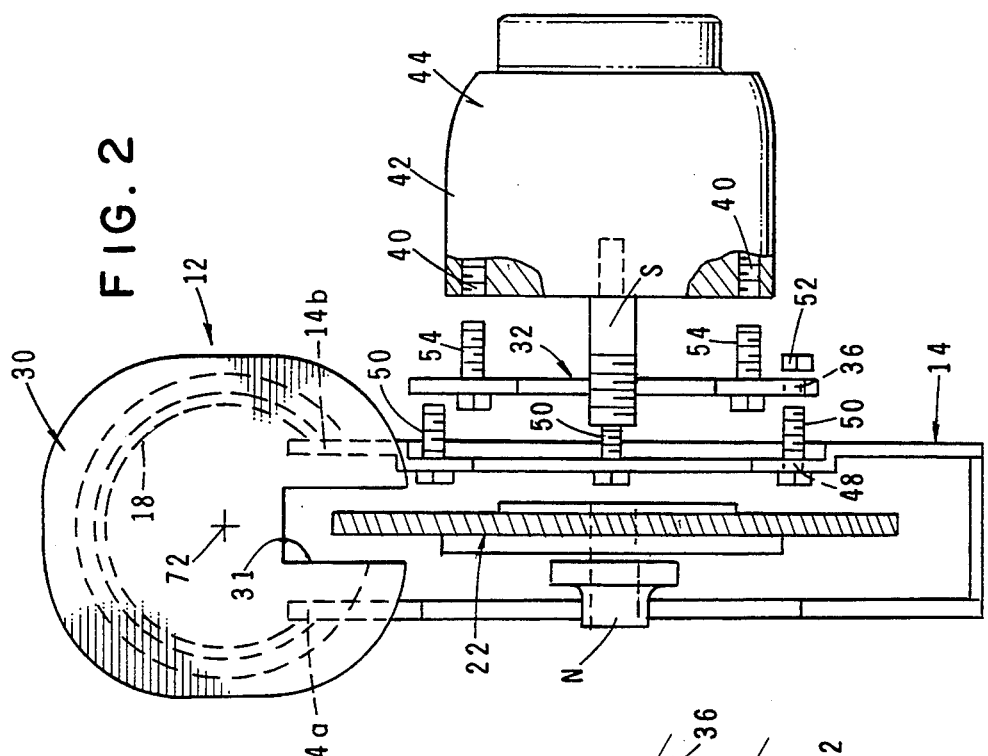
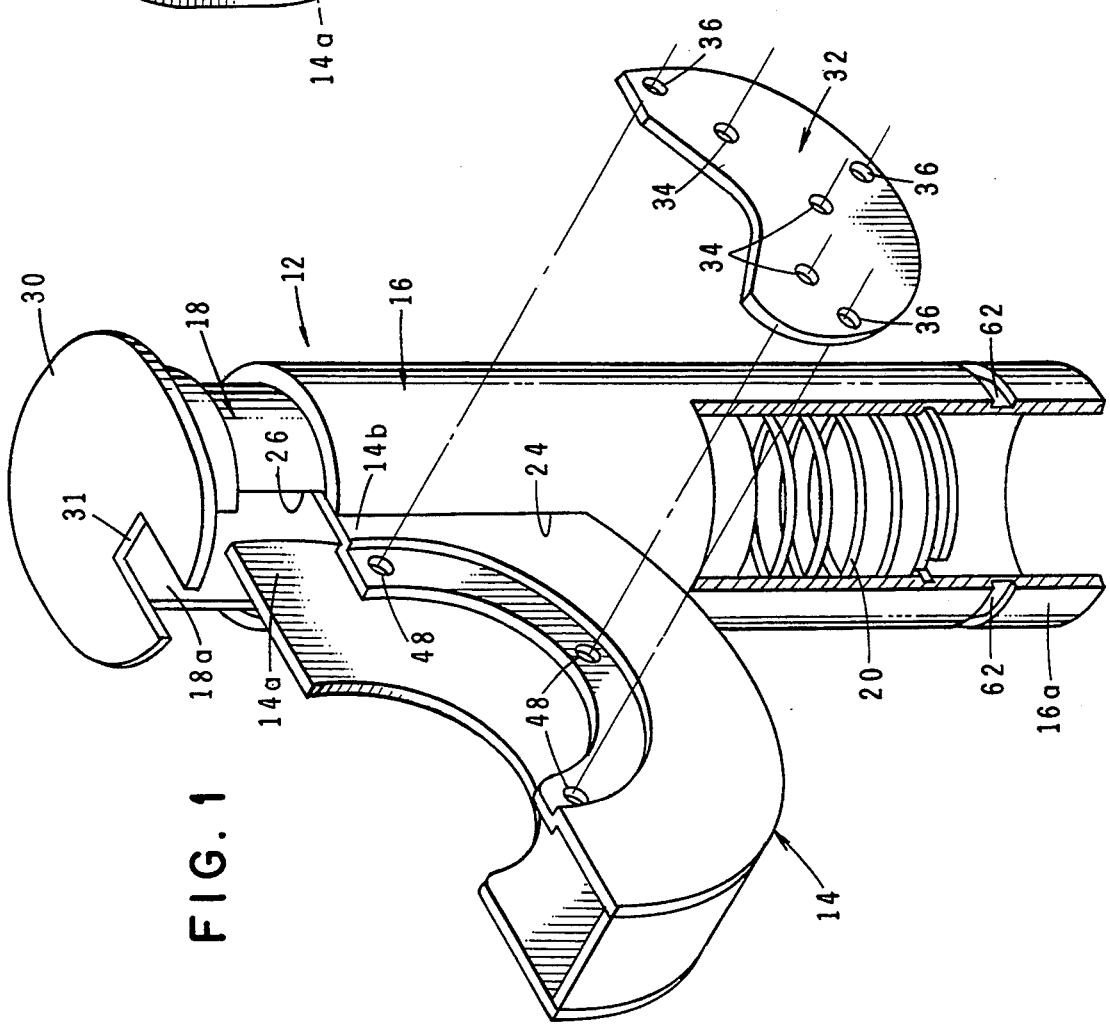

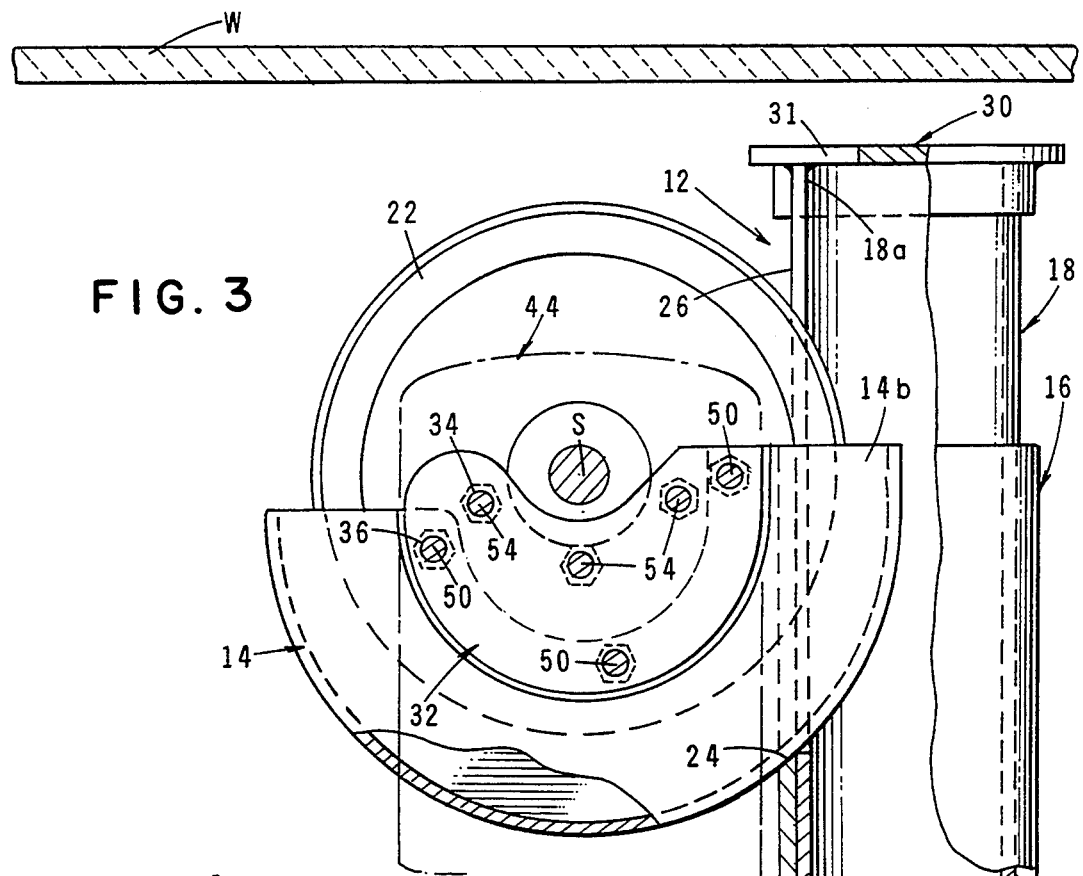
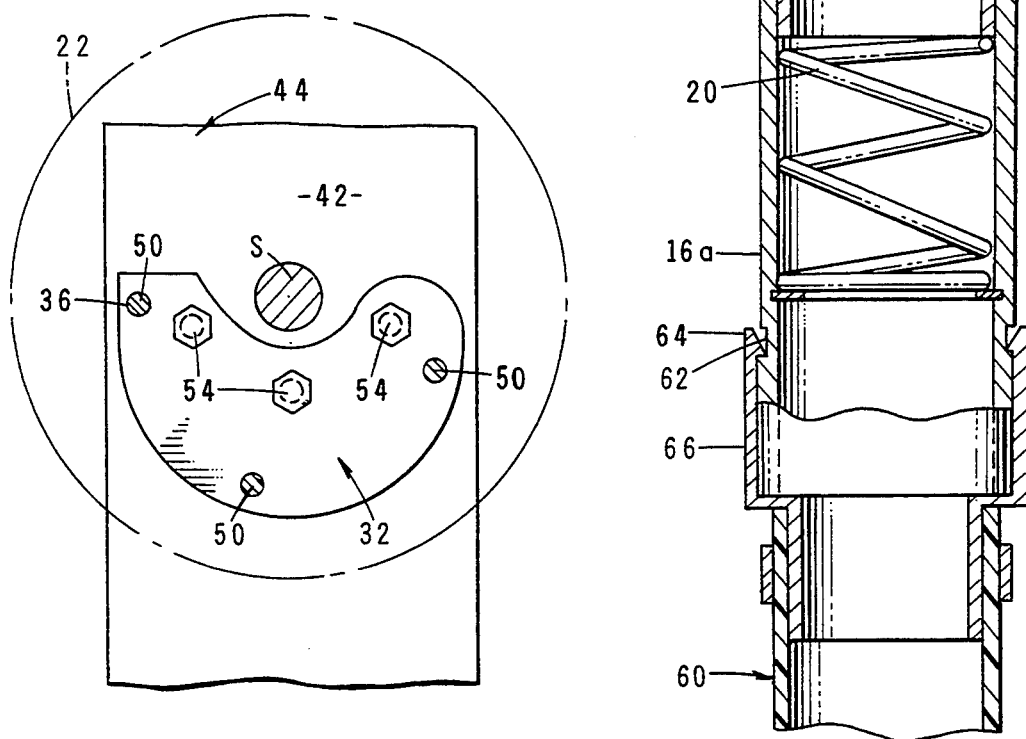

5,440,809

DUST COLLECTOR FOR HAND-HELD POWER TOOL

BACKGROUND OF THE INVENTION

1. Field of the Invention

The present invention relates generally to dust collecting apparatus. More particularly, the invention concerns an attachment for hand-held power tools for collecting debris generated during the use of the power tool in cutting plaster and various other materials.

2. Discussion of the Invention

Hand-held power tools, such as grinders and saws are widely used in the building industry. Such tools typically embody rotating cutting members, such as circular grinding wheels and blades that are typically rotated at several thousand revolutions per minute. These tools are used to cut plaster, ducting, tile and various other materials. During the cutting operation, particles resulting from the cut are expelled at high velocity into the surrounding environment presenting a substantial hazard to the operator and causing the contamination of tools and other articles that may be located proximate the work site.

When the tools are used to cut ducting which is covered with asbestos materials, a serious health hazard is created if the particulate matter emanating from the cutting operation is not immediately captured and contained.

Most commercially available hand-held power tools, such as grinders are provided with guards that cover a portion of the rotating cutting element and protect the operator from contacting the cutting element during cutting operations. However, these guards are totally ineffective in controlling dust contamination. Accordingly, attempts have been made in the past to attach vacuum hoses to the protective guard to collect dust produced during cutting operations. One such arrangement is described in U.S. Pat. No. 3,882,598 issued to Earle, et al. A somewhat similar arrangement is also disclosed in U.S. Pat. No. 4,022,182 issued to Lenkwich.

In U.S. Pat. No. 4,253,362 issued to Olson, a dust collecting apparatus for circular power saws is disclosed. This apparatus includes an integral sleeve which is attached to the guard casing of the saw and a tube which is slidably received in the sleeve so that one end of the tube can be adjustably positioned proximate the rearward extremity of the saw blade. The other end of the tube is connected with a vacuum source so that dust produced by the cutting blade can be captured. Clamping means are provided for holding the tube in a fixed position relative to the rearward periphery of the saw blade.

A pneumatic cutter for cutting concrete, which includes a suction pipe coupled to a disc cutter covering the cutter member, is disclosed in U.S. Pat. No. 4,974,907 issued to Komura. A somewhat similar device is illustrated and described in U.S. Pat. No. 3,585,980 issued to Mellor. The device of this latter patent is especially designed to remove mortar from between rows of bricks. Still another type of dust confining and collection housing is described in U.S. Pat. No. 4,255,995 issued to Connor.

Most of the prior art dust collection devices are designed for use with power tools, such as circular saws, that are most often used for cutting horizontally disposed planar work pieces such a sheets of plywood and the like. When the power tool is used for such cutting operations, the dust collection devices work in an acceptable manner and do not interfere with the cutting operation. However, when the hand-held power tool is to be used for cutting overhead workpieces or for cutting ducting and the like many of the prior art duct collection devices fail to work properly and often interfere with the cutting operation.

The thrust of the present invention is to provide a novel dust collecting apparatus that can be used with a variety of different types of hand-held power tools such as grinders, and one that is uniquely designed to insure that the cutting debris is effectively captured even when the power tool is used for overhead cutting or for cutting of irregular workpieces at odd angles. More particular, the novel apparatus of the invention includes a guard that replaces the guard provided with the tool, a sleeve attached to the guard and a tube which is telescopically movable within the sleeve from an extended position to a retracted position. The tube includes a first end having a workpiece engaging foot which is maintained in constant engagement with the work during the cutting operation by a biasing means which is carried within the sleeve. A vacuum source is interconnected with the sleeve so that debris generated during the cutting operation is efficiently captured and safely carried way from the cutting site. This arrangement is invaluable when the power tool is used, as for example, in cutting plaster or gypsum board overhead ceilings. In such cases, the work engaging foot of the apparatus is maintained in firm and steady engagement with the ceiling during the cutting operation and the dust collection apparatus in no way interferes with the use of the power tool.

SUMMARY OF THE INVENTION

It is an object of the present invention to provide a novel dust collection apparatus which is usable with various types of hand-held power tools, such as high speed grinders, and which surrounds the cutting element of the tool in a manner to efficiently capture the debris produced during the cutting operation.

Another object of the invention is to provide an apparatus of the character described which in no way interferes with the operation of the power tool even when the tool is being used for cutting overhead. More particularly, the apparatus is provided with a novel work engaging foot which is movable relative to the cutting tool during the cutting operation in a manner to insure the effective capture of substantially all of the particulate matter generated during cutting operation.

Another object of the invention is to provide an apparatus as described in the preceding paragraph in which the work engaging foot is uniquely spring loaded so as to maintain it in engagement with the surface of the workpiece throughout the cutting operation.

Still another object of the invention is to provide an apparatus of class described which includes guide walls disposed proximate the cutting member of the tool to effectively guide the dust particles into the sleeve of the device which is connected to the vacuum source.

Yet another object of the invention is to provide a dust collection apparatus which includes adapter means that permit the apparatus to be used with several types of commercially available power tools.

Another object of the invention is to provide an apparatus of the character described in the preceding paragraphs which is compact, light weight, easy to attach to various commercially available power tools, and is inexpensive to manufacture.

BRIEF DESCRIPTION OF THE DRAWINGS

FIG. 1 is a generally perspective, exploded view of one form of the apparatus of the present invention for collecting particulate matter produced by a hand-held power tool.

FIG. 2 is a plan view of the apparatus showing it in position for interconnection with a hand-held power tool such as a hand grinder.

FIG. 3 is a side-elevational view of the apparatus of the invention partly broken away to show internal construction and shown attached to the hand-held power tool.

FIG. 4 is a fragmentary, side-elevational view illustrating the use of the adapter plate of the apparatus to interconnect the apparatus with a power tool.

DESCRIPTION OF THE INVENTION

Figure 5:
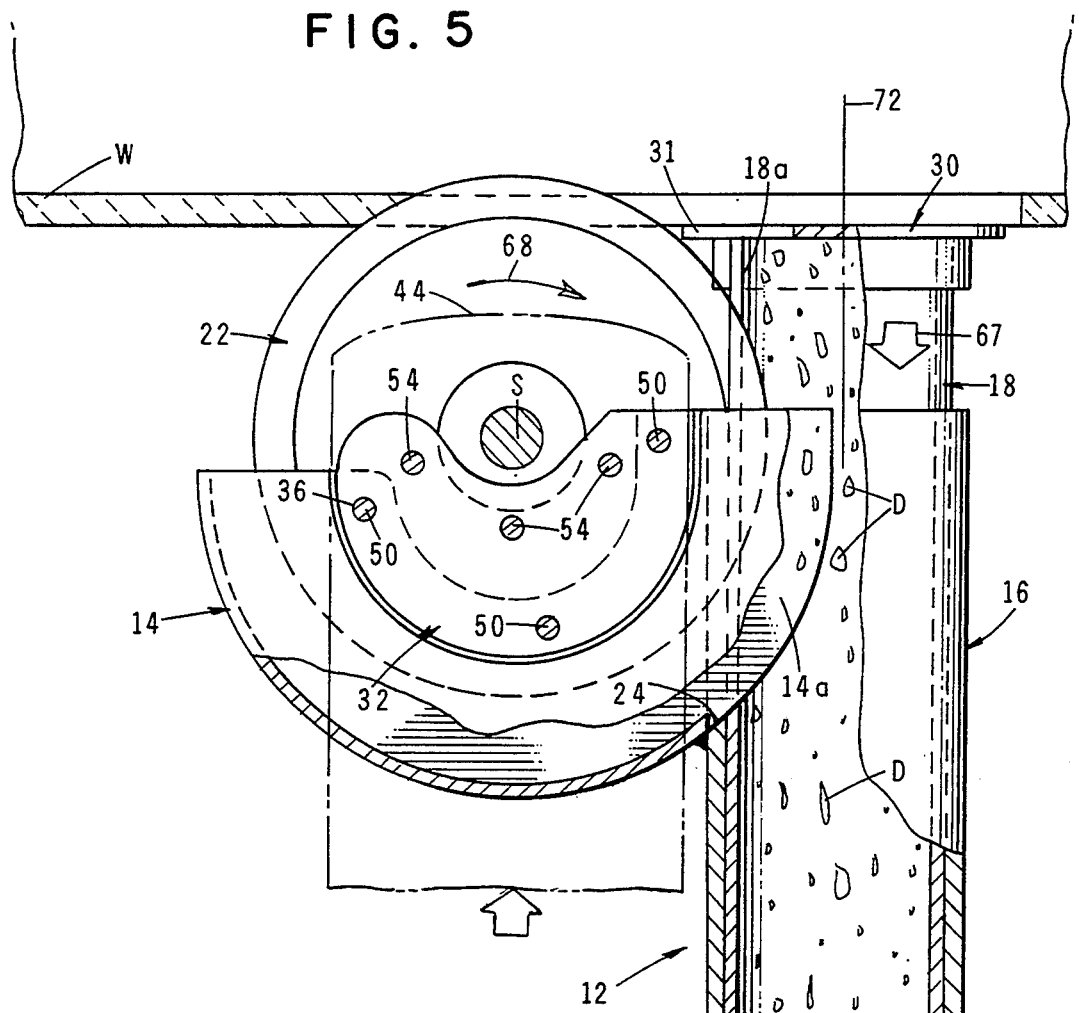
FIG. 5 is a side-elevational view partly in cross section similar to FIG. 3 but showing the device in position to cut an overhead workpiece.

Referring to the drawings and particularly to FIGS. 1, 2, and 3, one form of the apparatus of the invention for collecting particulate matter produced by a hand-held power tool of the character having a rotating member for cutting a workpiece is there shown and generally designated by the numeral 12. In this embodiment of the invention, the apparatus comprises a guard 14 for enclosing a portion of the rotating member of the tool, a generally cylindrically shaped sleeve 16 connected to guard 14 and a tubular member 18 which is telescopically receivable within the second open end 16a of sleeve 16. As indicated in FIG. 3, tubular member 18 is movable from the first extended position shown in FIG. 3 to the second retracted position shown in FIG. 5. Biasing means, shown here as a coil spring 20 is carried in the lower portion of sleeve 16 and functions to yieldably resist movement of tubular member 18 from the first extended position shown in FIG. 3 to the second retracted position shown in FIG. 5 upon the rotating member, or cutting wheel 22, being moved into engagement with the workpiece "W" in the manner shown in FIG. 5.

As best seen in FIG. 1, tubular member 16 is provided with a slot 24 which extends longitudinally thereof and which closely receives spaced-apart walls 14a and 14b of guard 14. In a manner presently to be described, walls 14a and 14b comprise the guide means of the invention for guiding the particulate matter produced by cutting the workpiece radially inwardly of sleeve 16. Tubular member 18 is also provided with a longitudinally extending slot 26 which is in alignment with slot 24 provided in sleeve 16.

Provided at the upper end 18a of tubular member 18 is a workpiece engaging member 30 which is also provided with a slot 31 which is located so as to receive a portion of cutting wheel 22 when the cutting wheel is moved into cutting engagement with the workpiece "W".

Figure 6:
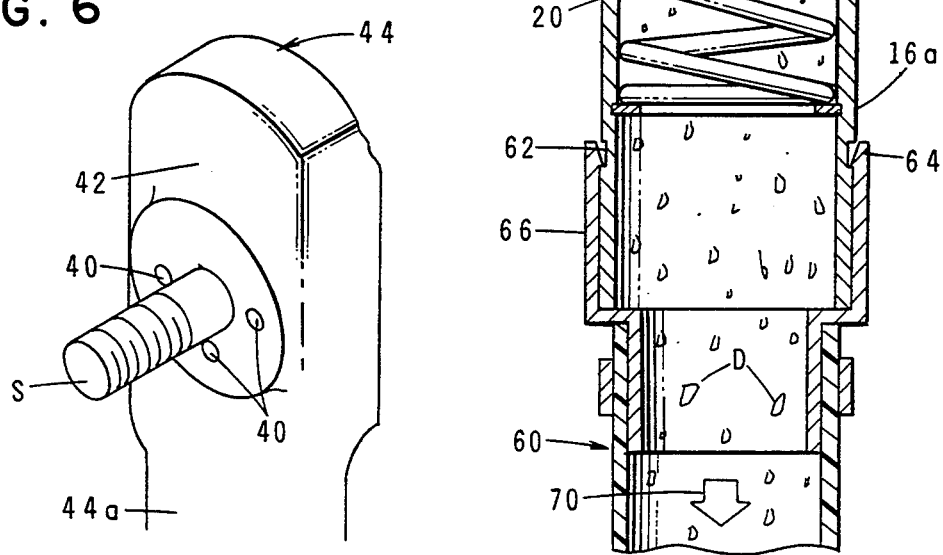
FIG. 6 is a fragmentary, generally perspective view of the upper portion of a typically constructed hand-held power tool with which the apparatus of the invention can be used.

A novel feature of the apparatus of the present invention resides in the provision of connector means for connecting guard 14 to a particular hand-held power tool. The connector means is here shown as a plate 32 which is provided with a first set of arcuately spaced apertures 34 and a second set of arcuately spaced apertures 36, the purpose of which will presently be described. As indicated in FIGS. 2 and 4, apertures 34 are arranged so as to align with threaded bores 40 provided in the head portion 42 of the hand-held tool 44 to which the apparatus is to be interconnected (see also FIG. 6). Apertures 36, on the other hand, are arranged to index with arcuately spaced apertures 48 provided in guard 14. As best seen in FIG. 2, threaded connectors 50 extend through apertures 48 and guard 14 and then through apertures 36 in connector plate 32 and are secured in position by threaded nuts 52. Similarly, threaded connectors 54 pass through apertures 34 and are received within threaded bores 40 provided in head 42 of hand-held tool 44. It will be understood that arcuately spaced holes 34 can be specially arranged to index with the appropriate threaded bores provided in the hand tool to which the apparatus is to be interconnected. For example, apertures 34 can comprise any number of apertures located in any particular hole pattern necessary to accommodate interconnection of the adapter plate to the threaded bores of the hand-held tool which normally connect the guard of the tool to the head portion 42 thereof. In this way, the apparatus of the invention can readily be used with a number of different types of hand-held power tools.

In using the apparatus of the invention, the cutting member 22 and the guard provided with the hand-tool 44 are initially removed. This done, plate 32 is connected to the hand-held tool using connectors 54 which are threaded into bores 40 provided in head 42 of the hand-held tool. After the adapter plate has been connected to the tool, guard 14 is connected to the aperture place using connector members 50 which are secured in place by nuts 52. Once the guard is in position, cutting wheel 22 is mounted on shaft "S" of the power tool and secured in place using connector nut n11.

After the apparatus has been interconnected with the hand-held power tool, a vacuum hose 60 is connected proximate the first end 16a of sleeve 16 in the manner shown in FIG. 3. More particularly, sleeve 16 is provided with a circumferentially extending groove 62 which is adapted to receive connector members 64 of a vacuum hose connector adapter 66. Adapter 66 is of a character well known in the art and is provided for use in interconnecting vacuum hoses of standard size to various types of implements.

With the vacuum hose appropriately interconnected to the apparatus, the operator grasps the handle portion 44a of the power tool (FIG. 6) and when, for example, cutting an overhead workpiece moves the workpiece engaging plate 30 into engagement with the workpiece in the manner shown in FIG. 5. An upward movement of the hand tool causes tubular member 18 to move in the direction of the arrow 67 (FIG. 5) from the extended position shown in FIG. 3 to the retracted position shown in FIG. 5. As the tool is moved upwardly, cutting wheel 22 moves into cutting engagement with the workpiece "W" which is rotating in the direction of the arrow 68 shown in FIG. 5. As the cutting wheel cuts the workpiece, debris "D" will be directed by guide plates 14a and 14b in to the interior of sleeve 16 in the manner illustrated in FIG. 5. The debris entering tube 18 will be sucked downwardly through the tube in the direction of the arrow 70 by the vacuum source wherein the debris can be safely collected in a collection bag which forms a part of the vacuum source. As indicated in FIG. 5, as tube 18 moves telescopically within sleeve 16, spring 20 is compressed but continuously urges sleeve 18 toward the workpiece as the cutting wheel 22 cuts the workpiece "W".

As shown in FIGS. 2 and 5, cutting wheel 22 rotates in a plane which includes the longitudinal axis 72 of tubular member 18. Similarly, workpiece engaging plate extends generally perpendicularly to axis 72 of tube 18. With this unique arrangement, the apparatus of the invention can be maintained in firm steady engagement with the workpiece while the cutting tool is rotated in the plan of the axis tubular member 18 so that the debris generated by the cutting wheel will pass between guide plates 14a and 14b and will be efficiently captured within the interior of tube 18 so it can be safely carried away by the vacuum generated by the vacuum source.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

I claim:

1. An apparatus for collecting particulate matter produced by a hand-held power tool of the character having a rotating member for cutting a workpiece, said apparatus comprising:
   (a) a guard for enclosing a portion of the rotating member of the tool;
   (b) a sleeve connected to said guard, said sleeve having first and second ends and a longitudinally extending slot, said first end being interconnectable with a vacuum source;
   (c) a tubular member telescopically receivable within said second end of said sleeve for movement from a first extended position to a second retracted position, said tubular member having first and second ends, said first end being disposed within said sleeve and said second end thereof being engagable with the workpiece, said tube being provided with a slot extending longitudinally thereof and disposed substantially in alignment with said slot in said sleeve for accommodating a portion of the rotating member;
   (d) biasing means carried by said sleeve for yieldably resisting movement of said tubular member from said first extended position to said second retracted position upon said rotating member being moved into cutting engagement with the workpiece, said biasing means comprising a coil spring disposed interiorly of said sleeve in engagement with said first end of said tubular member; and
   (e) connector means for connecting said guard to the power tool.

2. An apparatus as defined in claim 1 in which said connector means comprises an adapter plate provided with spaced apart apertures for use in connecting said adapter plate to the power tool.

3. An apparatus as defined in claim 1 in which said guard includes guide means for guiding the particulate matter produced by cutting the workpiece radially inwardly of said sleeve.

4. An apparatus as defined in claim 1 in which said second end of said tubular member is closed by a workpiece engaging plate having a slot therein for receiving a portion of the rotating member upon movement of the rotating member into cutting engagement with the workpiece.

5. An apparatus as defined in claim 4 in which said tubular member has a longitudinally extending axis disposed substantially perpendicular to said workpiece engaging plate.

6. An apparatus as defined in claim 5 in which the rotating member rotates in a plane which includes said longitudinal axis of said tubular member.

7. A dust collecting apparatus for interconnection with a hand-held power tool of the character having a rotating member for cutting a workpiece, said apparatus comprising:
   (a) a guard for enclosing a portion of the rotating member of the tool;
   (b) an elongated tubular sleeve connected to said guard and extending therefrom, said sleeve having first and second ends and a longitudinally extending slot, said first end being interconnectable with a vacuum source;
   (c) a tubular member having first and second ends, said tubular member being telescopically receivable within said second end of said sleeve for movement between a first extended position wherein said second end thereof protrudes from said sleeve to a second retracted position, said tubular member having a longitudinally extending slot aligned with said slot in said sleeve; and
   (d) a spring disposed interiorly of said sleeve in engagement with said first end of said tubular member for resisting movement thereof between said first position and said second position.

8. An apparatus as defined in claim 7 in which said first end of said tubular member is provided with a workpiece engagement means for engaging the workpiece prior to the rotating member of the tool being moved into cutting engagement with the workpiece.

9. An apparatus as defined in claim 8 in which said workpiece engagement means comprises a flat plate.

10. A dust collecting apparatus for use with a hand-held power tool of the character having a rotating member for cutting a workpiece, said apparatus comprising:
   (a) a guard for enclosing a portion of the rotating member of the tool, said guard includes guide means for guiding the dust generated by the rotating member in a direction away from the rotating member;
   (b) connector means for connecting said guard to the power tool;
   (c) an elongated tubular sleeve connected to said guard and extending therefrom, said sleeve having first and second ends and a longitudinally extending slot, said first end being interconnectable with a vacuum source;
   (d) a tubular member having first and second ends, said tubular member being telescopically receivable within said second end of said sleeve for movement between a first extended position wherein said second end thereof protrudes from said sleeve to a second retracted position, said tubular member having a longitudinally extending axis and a longitudinally extending slot, said rotating member of the tool rotating within a plane that includes said axis;

(e) a workpiece engagment means connected to said tubular member for engaging the workpiece; and (f) a spring disposed interiorly of said sleeve in engagement with said first end of said tubular member for resisting movement thereof between said first position and said second position.

11. An apparatus as defined in claim 10 in which said guide means comprises spaced-apart walls extending inwardly of said tubular member.

12. An apparatus as defined in claim 10 in which said workpiece engagement means comprises a flat plate disposed in a plane generally perpendicular to said longitudinally extending axis of said tubular member.

13. An apparatus as defined in claim 10 in which said connector means comprises an adapter plate provided with spaced-apart apertures for use in connecting said adapter plate to the power tool.

14. An apparatus as defined in claim 10 in which said first end of said tubular sleeve includes means for connecting a vacuum source thereto.

* * * * *